United States Patent [19]
Yoshida et al.

[11] Patent Number: 5,894,247
[45] Date of Patent: Apr. 13, 1999

[54] OPTICAL PLL CIRCUIT AND METHOD OF CONTROLLING THE SAME

[75] Inventors: Masanori Yoshida; Kenichi Yoneyama; Tohru Taura, all of Tokyo, Japan

[73] Assignee: NEC Corporation, Tokyo, Japan

[21] Appl. No.: 08/985,066

[22] Filed: Dec. 4, 1997

[30] Foreign Application Priority Data

Dec. 4, 1996 [JP] Japan .................................. 8-337726

[51] Int. Cl.$^6$ ...................................................... H03L 7/06
[52] U.S. Cl. ............................ 331/18; 331/1 A; 331/66; 327/156; 455/260
[58] Field of Search ............................ 331/1 A, 18, 25, 331/66; 327/156–159; 455/260

[56] References Cited

U.S. PATENT DOCUMENTS 5,302,918  4/1994  Sturzebecher et al. ................... 331/10

FOREIGN PATENT DOCUMENTS 7120978  12/1995  Japan .

*Primary Examiner*—David Mis
*Attorney, Agent, or Firm*—Sughrue, Mion, Zinn, Macpeak & Seas, PLLC

[57] ABSTRACT

An optical PLL circuit with high precision that has its simplified configuration. An optical-intensity modulator creates difference frequency information ($N \times \Delta f$) by modulating a received optical signal formed of signal optical pulses of a repetitive frequency ($N \times f0$) with a reference signal of a frequency ($f0 + \Delta f$) and implementing an AND operation of them. The signal is converted into an electric signal by a photo diode. A band-pass filter extracts only the low frequency component ($N \times \Delta f$). A frequency divider produces a frequency component $\Delta f$ by dividing the extracted component by N. A multiplier receives the reference signal and the output signal f of a voltage-controlled oscillator and then creates the difference frequency component (($f0 + \Delta f$)$-f$). A phase comparator compares the low frequency component $\Delta f$ with the difference frequency component (($f0 + \Delta f$)$-f$) and controls the voltage-controlled oscillator to set the phase difference between them to zero.

8 Claims, 8 Drawing Sheets

OPTICAL PLL CIRCUIT AND METHOD OF CONTROLLING THE SAME

BACKGROUND OF THE INVENTION

The present invention relates to an optical PLL (Phase-Locked Loop) circuit adopted for optical signal process in an ultra-high speed optical repeater, an ultra-high speed optical terminal, or the like, the optical PLL circuit producing a clock signal (a chain of clock pluses) which is synchronized in phase with the light-intensity modulation signal contained in a received optical signal light-intensity-modulated. The present invention also relates to a method of controlling an optical PLL circuit.

Recently, there have been strong demands for further improving high speed, large capacity communications means. The limits in operational speed of the electric circuits have made it difficult to realize higher speed transmission in the current system. Many institutes for research are now studying the optical signal processing technique which can directly process optical signals, without any change, to be adopted for the next-generation ultra-high-speed, large capacity optical communication means. Optical PLL circuits are conveniently used as optical timing extraction means important in the optical processing.

FIG. 8 illustrates the basic configuration of a conventional optical PLL circuit disclosed in JP-A 212036/1989.

In this prior art, the relation between the repetitive frequency of a received optical signal and a clock signal timing-extracted corresponds to the case of N=1 (where N is a natural number) in the present invention.

A mixer 308 receives the oscillation signal of a frequency f from a voltage-controlled oscillator 306 and the output signal of a frequency $\Delta f$ from a low frequency oscillator 307 and then produces the frequency component (f+$\Delta f$) of an optical signal. An optical amplifier 302 modulates the input signal from the signal input terminal 301 under control of the frequency component. When the optical amplifier 302 receives a received optical signal of a repetitive frequency f0 and then creates an optical signal of a difference frequency component ((f+$\Delta f$)–f0). A light receiving element 303 converts the difference frequency component into an electric signal. The narrow band-pass filter 304 extracts only the low frequency component (f+$\Delta f$–f0) from the converted electric signal. In response to the output from the narrow band-pass filter 304, the frequency discriminator produces a control voltage to the voltage-controlled oscillator 306 so as to equalize the difference frequency (f+$\Delta f$–f0) to the frequency $\Delta f$.

In such a manner, when the voltage-controlled oscillator 306 is controlled, the frequency f equals the frequency f0. Hence, the voltage-controlled oscillator 306 produces an output signal which has the same repetitive frequency as that of a received optical light signal and is in synchronism with the phase thereof. The optical pulse generator 309 receives the output signal from the voltage-controlled oscillator 306 and then produces a chain of optical clock pulses which has a repetitive frequency f0 and which is in synchronism with the phase thereof.

The conventional optical PLL circuit requires a frequency mixer that creates the sum frequency (f+$\Delta f$) of the output frequency f of the voltage-controlled oscillator and the output frequency $\Delta f$ of the low frequency oscillator.

However, the mixer with a normal intensity produces the frequency component (f–$\Delta f$) together with the frequency component (f+$\Delta f$), and both the frequency components are spaced at narrow frequency intervals twice the low frequency $\Delta f$. Hence, it is very difficult to realize the mixer that outputs only the frequency components (f+$\Delta f$). Such an ideal mixer is complicated in the circuit configuration. Moreover, the frequency mixing characteristics makes is difficult to realize an optical PLL circuit with high precision characteristics.

SUMMARY OF THE INVENTION

The present invention is made to solve the above-mentioned problems. The objective of the present invention is to provide an optical PLL circuit which has a simplified configuration and creates a chain of clock signals from a received optical signal with high precision.

Another objective of the present invention is to provide a method of controlling an optical PLL circuit which has a simplified configuration and creates a chain of clock signals from a received optical signal with high precision.

The objective of the present invention is achieved by an optical PLL (Phase-Locked Loop) circuit that receives an optical signal of a repetitive frequency N times (N is an arbitrary natural number) of a clock frequency f0 and then produces a clock signal in synchronism with the received optical signal, comprising reference oscillator for generating a reference signal (f0+$\Delta f$) which is shifted from the clock frequency f0 by a frequency $\Delta f$; a voltage-controlled oscillator for generating a clock signal; optical system means for creating a difference frequency component by implementing an AND operation of the received optical signal and the reference signal; optical signal detecting means for extracting the difference frequency component as an electric signal; a multiplier for creating a difference frequency component between an output signal from the reference oscillator and an output signal from the voltage-controlled oscillator; phase difference comparison means for comparing the phase of an output signal from the optical signal detecting means with the phase of an output signal from the multiplier; and means for controlling the voltage-controlled oscillator with an output signal from the phase difference comparison means.

In the optical PLL circuit, the optical system means implements an AND operation by combining the received optical signal with a reference optical signal, the reference optical signal being produced by intensity modulating output light from a light source with the reference signal.

In the optical PLL circuit, the optical system means implements an AND operation by combining the received optical signal with a reference optical signal, the reference optical signal being produced by intensity modulating output light from a light source with the reference signal, and then amplifying the combined signal by means of a semiconductor laser amplifier.

In the optical PLL circuit, the optical system means implements an AND operation by intensity-modulating the received optical signal with a reference optical signal.

In the optical PLL circuit, the optical system means implements an AND operation by inputting the received optical signal and a reference optical signal to a non-linear loop mirror circuit, the reference optical signal being produced by intensity modulating a mode synchronous semiconductor laser with the reference signal.

According to the present invention, an optical PLL (Phase-Locked Loop) circuit that receives an optical signal of a repetitive frequency N times (N is an arbitrary natural number) of a clock frequency f0 and then produces a clock signal in synchronism with the received optical signal from the received optical signal, comprises a reference oscillator for generating a reference signal (f0+Δf) which is shifted from a clock frequency f0 by a frequency Δf; a light intensity modulator for implementing an AND operation of the received optical signal and an output signal from the reference oscillator; a light receiving element for converting an output signal from the light intensity modulator into an electric signal; a narrow band pass filter for extracting a low frequency component (N×Δf) of an electric signal output from the light receiving element; a frequency divider for dividing the frequency of the low frequency component output from the narrow band pass filter by N; a voltage-controlled oscillator for generating a clock signal; a multiplier for creating the frequency reference component ((f0+Δf)−f) between an output signal from the reference oscillator and an output from the voltage-controlled oscillator; a low pass filter for extracting a low frequency component output from the multiplier; and a phase comparator for detecting the phase difference between the low frequency component output from the frequency divider and the low frequency component from the low pass filter and then controlling the voltage-controlled oscillator so as to achieve agreement in phase between the low frequency components.

Moreover, according to the present invention, an optical PLL (Phase-Locked Loop) circuit that receives an optical signal of a repetitive frequency N times (N is an arbitrary natural number) of a clock frequency f0 and then produces a chain of clock pluses in synchronism with the received optical signal from the received optical signal, comprises a reference oscillator for generating a reference signal (f0+Δf) which is shifted from a clock frequency f0 by a frequency Δf; a light intensity modulator for implementing an AND operation of the received optical signal and an output signal from the reference oscillator; a light receiving element for converting an output signal from the light intensity modulation circuit into an electric signal; a narrow band pass filter for extracting a low frequency component (N×Δf) of an electric signal output from the light receiving element; a voltage-controlled oscillator for generating a chain of clock pulses; a multiplier for creating the difference frequency component ((f0+Δf)−f) between an output signal from the reference oscillator and an output from the voltage-controlled oscillator; a low pass filter for extracting a low frequency component output from the multiplier; a frequency multiplier for multiplying the low frequency component output from the low pass filter by N; and a phase comparator for detecting the phase difference between the low frequency component output from the narrow band filter and the low frequency component from the multiplying circuit and then controlling the voltage-controlled oscillator so as to achieve agreement in phase the low frequency components.

Furthermore, according to the present invention, a method of controlling an optical PLL circuit including a reference oscillator and a voltage-controlled oscillator, comprises the steps of implementing an AND operation of a received optical signal of a repetitive frequency (N×f0) (where f0 is a clock signal) and an oscillation signal of an oscillation frequency (f0+Δf) from the reference oscillator to produce an optical signal containing a low frequency component (N×Δf), converting the optical signal into an electric signal, extracting only the low frequency component (N×Δf) from the electric signal, multiplying an oscillation signal of a frequency f by the oscillation signal of the oscillation frequency (f0+Δf) to create a signal of a difference frequency component ((f0+Δf)−f), comparing in phase the low frequency (N+Δf) with the difference frequency component ((f0+Δf)−f), and controlling a control voltage to the voltage-controlled oscillator so as to agree the phase of the low frequency with the phase of the difference frequency component, wherein the frequency f of the oscillation signal from the voltage-controlled oscillator is equalized to the clock frequency f0.

The optical system circuit such as an light-intensity modulator implements an AND operation of a received optical signal of a repetitive frequency (N×f0) and an output signal from the reference oscillator and then produces an optical signal containing only a low frequency component (N×Δf). The light receiving element converts the optical signal into an electric signal which contains the low frequency component (N×Δf). The narrow band-pass filter extracts only the low frequency component.

Next, the multiplier multiplies the output signal (f) from the voltage-controlled oscillator by the output signal (f0×Δf) from the reference oscillator to produce the reference frequency signal ((f0×Δf)−f).

The phase comparator compares the phases of the two low frequencies (N×Δf) and ((f0×Δf)−f) and then controls the control voltage to the voltage-controlled oscillator so as to achieve agreement between the two phases. In this operation, the phase is synchronized by equalizing the frequency f of the output signal from the voltage-controlled oscillator with the clock frequency f0.

According to the characteristics of the phase comparator, the two frequencies are nearly equalized by dividing the low frequency component (N×Δf) by N or multiplying the difference frequency component ((f0×Δf)−f) by N, so that the phase comparing operation is carried out.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, an embodiment of the present invention will be described below in detail with reference to the attached drawings.

Figure 1:
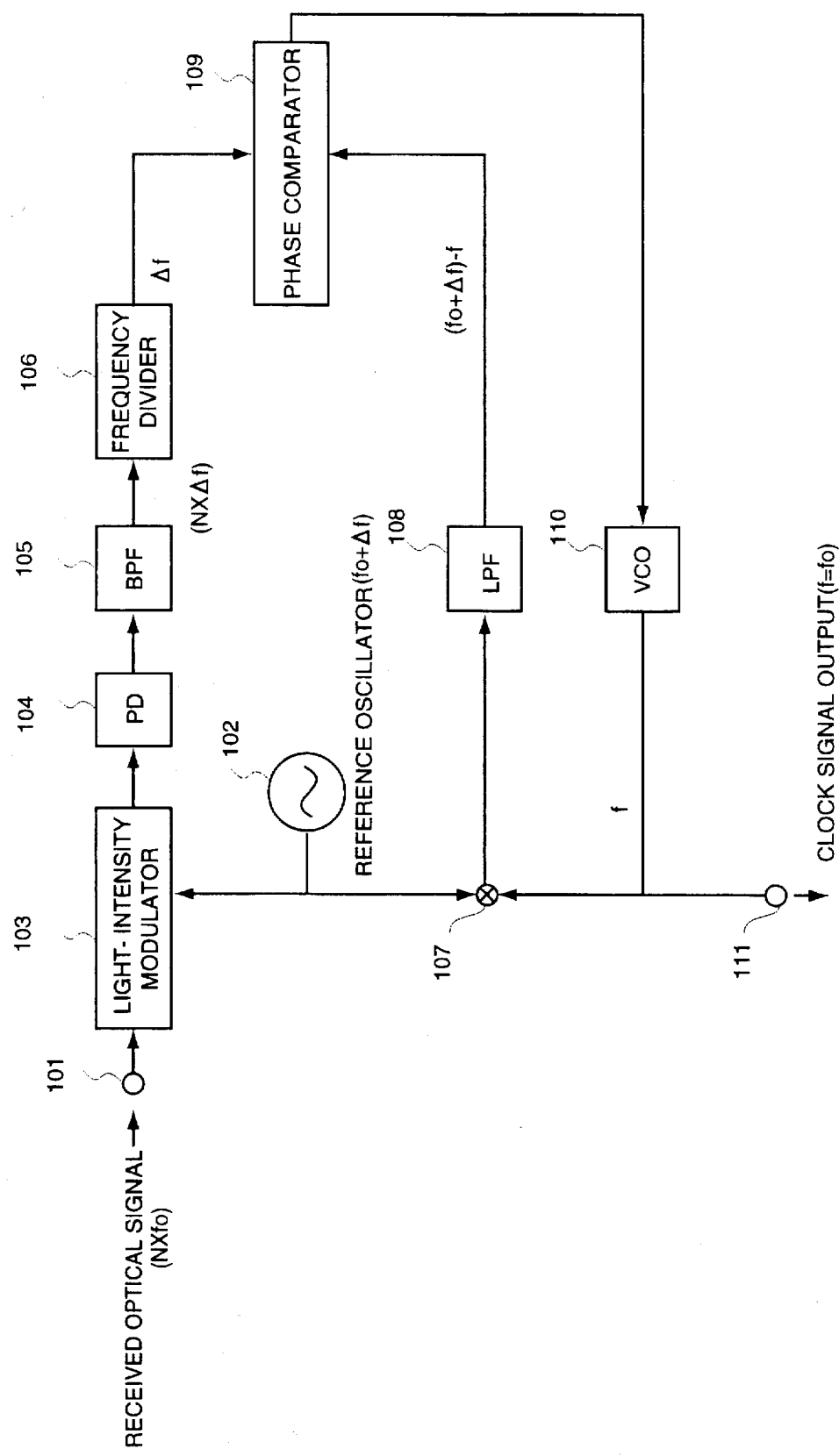
FIG. 1 is a block diagram showing the basic configuration of an optical PLL circuit according to the present invention.

FIG. 1 is a block diagram showing the basic configuration of an optical PLL circuit according to the present invention.

The optical PLL circuit includes a reference oscillator 102 that produces a reference signal of an oscillation frequency (f0+Δf) shifted by Δf with respect to a clock frequency f0 to be reproduced from a received optical signal light-intensity-modulated with a signal of a repetitive frequency (N×f0).

An AND process optical system circuit such as the light-intensity modulator 103 implements an AND process of the received optical signal of a repetitive frequency (N×f0) and the output signal of an oscillation frequency (f0×Δf) from the reference oscillator 102 and then outputs an optical signal containing the low frequency component (N×Δf). The light receiving element 104 converts the optical signal into an electric signal. The band-pass filter (BPF) 105 extracts only a low frequency component (N×Δf) from the electric signal. The frequency divider 106 inputs the low frequency component and then outputs a low frequency signal of a frequency Δf to the phase comparator 109.

In response to the output signal of an oscillation frequency (f0+Δf) from the reference oscillator 102 and the output signal of a frequency f from voltage-controlled oscillator 110, the multiplier 107 produces the difference frequency component ((f0+Δf)−f). The low pass filter (LPF) 108 receives the difference frequency component from the multiplier 107 and then outputs the difference frequency component ((f0+Δf)−f) to the phase comparator 109.

The phase comparator 109 controls the control voltage to the voltage-controlled oscillator 110 such that the phase of the low frequency component f coincides with the phase of the low frequency component ((f0+Δf)−f). Thus, the frequency f of the output signal from the voltage-controlled oscillator 110 is equally set to the clock frequency f0. The voltage-controlled oscillator 110 outputs its output signal as a clock signal (a chain of clock-pulses) (of a clock frequency f0) with a phase in synchronism with a received optical signal from the clock signal output port 111.

Figure 2:
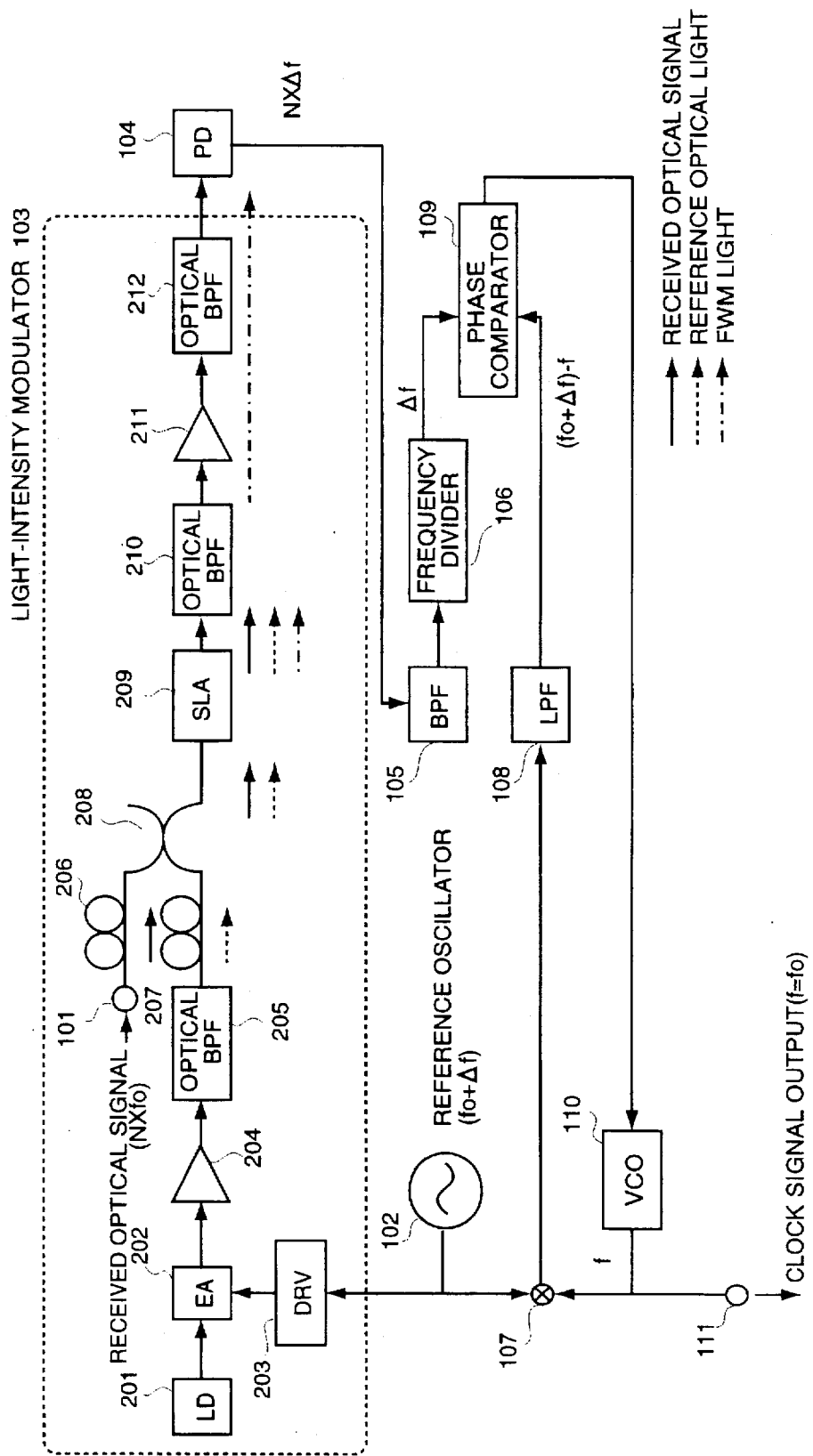
FIG. 2 is a schematic diagram showing the optical PLL circuit according to the first embodiment of the present invention.
Figure 3:
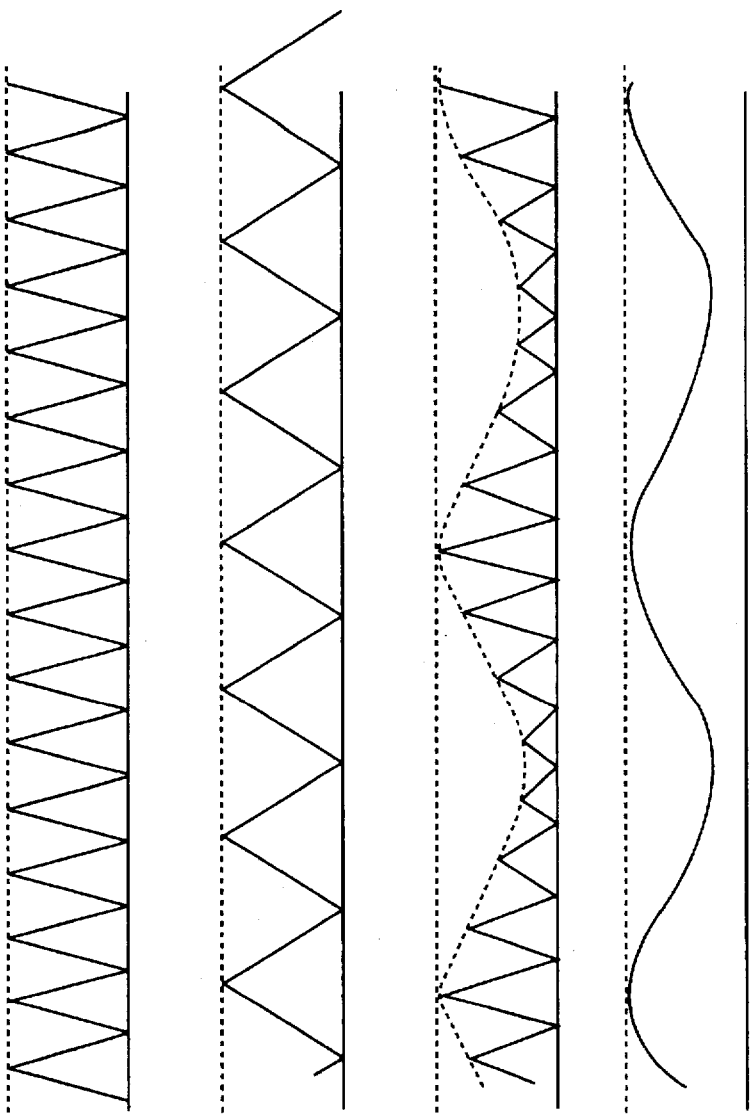
FIG. 3(a) to FIG. 3(d) are explanatory diagrams showing the operation of a light intensity modulator.

FIG. 2 is a block diagram illustrating an optical PLL circuit according to the first embodiment of the present invention.

The PLL circuit includes a reference oscillator 102 that generates an oscillation signal of an oscillation frequency (f0+Δf) with respect to a received optical signal of a repetitive frequency (N×f0). The light intensity modulator 103 uses an optical AND circuit that produces a four wave mixed light (hereinafter, referred to as FWM) (reference literature: Institute of Electronics, Information and Communication Engineers of Autumn Convention, T. Saito et. al, B-923, pp 4–164, 1993).

The optical intensity modulator 103 comprises a light source 201 for generating light (λ0+Δλ) of which the wavelength is shifted by Δλ from the wavelength 10 of a received optical signal, an electro absorption modulator (hereinafter referred to as an EA modulator) 202 for light-modulating light output from the light source 201, a high rate driver (DRV) 203 for driving the EA modulator 202 at a repetitive frequency (f0+Δf), an optical amplifier 204 for amplifying light from the EA modulator 202, an optical band-pass filter 205 for extracting only the wavelength band of the light source 201 from the output light of the optical amplifier 204, a polarized wave controller 206 for adjusting the state of the polarized wave of a received optical signal, a polarized wave controller 207 for adjusting the state of the polarized wave of an output light from the optical band pass filter 205, an optical coupler 208 for combining the output from the polarized wave controller 206 with the output from the polarized wave controllers 207, a semiconductor laser amplifier 209 for mixing a received optical signal combined by the optical coupler 208 with a signal of a frequency (f0+Δf) created by the EA modulator and then generating a four wave mixed (FWM) light, an optical band pass filter 210 for extracting only the FWM light from the output light of the semiconductor laser amplifier 209, an optical amplifier 211 for amplifying the FWM light extracted by the optical band pass filter 210, and an optical band pass filter 212 for extracting only the FWM light out of the output light of the optical amplifier 211.

The light source 201 generates the light (λ0+Δλ) shifted by only Δλ from the wavelength 10 of a received optical signal and inputs it to the EA modulator 202. The reference oscillator 102 outputs its oscillation signal to the high-rate driver 203. The EA modulator 202 intensity-modulates the output light from the light source 201 with the output from the high-rate driver 203, thus producing a reference optical signal of a repetitive frequency (f0+Δf). The optical amplifier 204 amplifies the reference optical signal output from the EA modulator 202. Then the optical band pass filter (optical BPF) 205 removes unnecessary light components to extract only the reference optical signal. The polarized wave controller 207 adjusts the polarized wave of the extracted reference optical signal and then inputs the resultant to the optical coupler 208. The polarized wave controller adjusts the polarized wave of a received optical signal and then inputs the resultant to the optical coupler 208.

The semiconductor laser amplifier (SLA) 209 receives the output from the optical coupler 208 and mixes the received optical signal combined by the optical coupler 208 with the reference optical signal of a frequency (f0+Δf) created by the EA modulator 202, thus outputting a four light wave mixed (FWM) light. The optical amplifier 211 amplifies the FWM light extracted by the optical band pass filter 210. Then the optical band pass filter 212 removes undesired light to extract only the FWM light.

The extracted FWM light equals the result of an AND operation of the received optical signal and the reference optical signal. The FWM light contains information regarding the difference between the modulation signal of the received optical signal light-intensity-modulated and the reference optical signal. The light receiving element 104 converts the FWM light into an electric signal.

FIGS. 3(a) to (d) are diagrams illustrating waveforms at various portions of the light-intensity modulator 103. Referring to FIG. 3, the light-intensity modulator 103 implements an AND operation of the received optical signal (a) of a repetitive frequency (N×f0) and the output signal (b) of an oscillation frequency (f0+Δf) of the reference oscillator and then outputs the optical signal (c). The light emitting element 104 converts the output signal light light-intensity-modulated into an electric signal. The band pass filter 105 extracts a low frequency signal (N×Δf) contained in the electric signal. The frequency divider 106 receives the extracted low frequency signal and divides it by N, thus creating a signal of a low frequency Δf. The phase comparator 109 receives the created low frequency signal Δf.

The multiplier 107 receives the output of the voltage-controlled oscillator 110 and the output of the reference oscillator 102 and then outputs the signal containing a low frequency component ((f0+Δf)−f), that is, the frequency difference component between them. The low pass filter (LPF) 108 extracts only the low frequency component ((f0+Δf)−f) from the output signal of the multiplier 107 and then inputs it to the phase comparator 109.

Figure 4:
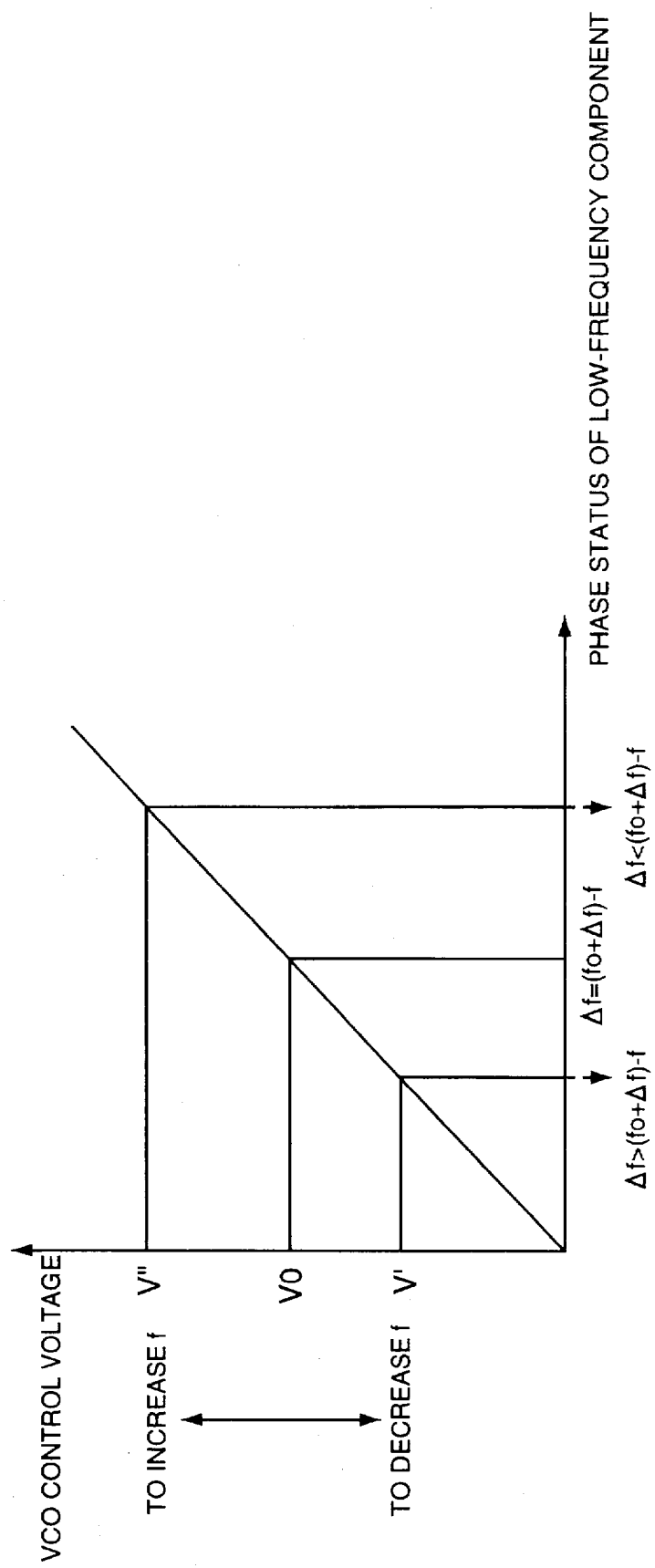
FIG. 4 is an explanatory diagram showing the operation of a phase comparator.

FIG. 4 is a diagram explaining the operation of the phase comparator.

When the phase of the low frequency signal Δf coincides with the phase of the low frequency signal ((f0+Δ)−f), or f=f0, the phase comparator 109 outputs a control voltage VO to the voltage-controlled oscillator 110. When the phase of the frequency Δf lags behind the phase of the frequency ((f0+Δf)−f), or (f>f0), the phase comparator 109 outputs the control voltage V' to the voltage-controlled oscillator 110 to decrease the oscillation frequency thereof. When the phase of the frequency Δf leads the phase of the frequency ((f0+Δ)−f), or (f<f0), the phase comparator 109 outputs the control voltage V" to the voltage-controlled oscillator 110 to increase the oscillation frequency thereof.

The voltage-controlled oscillator 110 is controlled by the output voltage from the phase comparator 109 to accomplish f=f0. Thus, the voltage-controlled oscillator 110 outputs a clock signal synchronized in phase at the frequency f0 to the clock signal output terminal 111.

Figure 5:
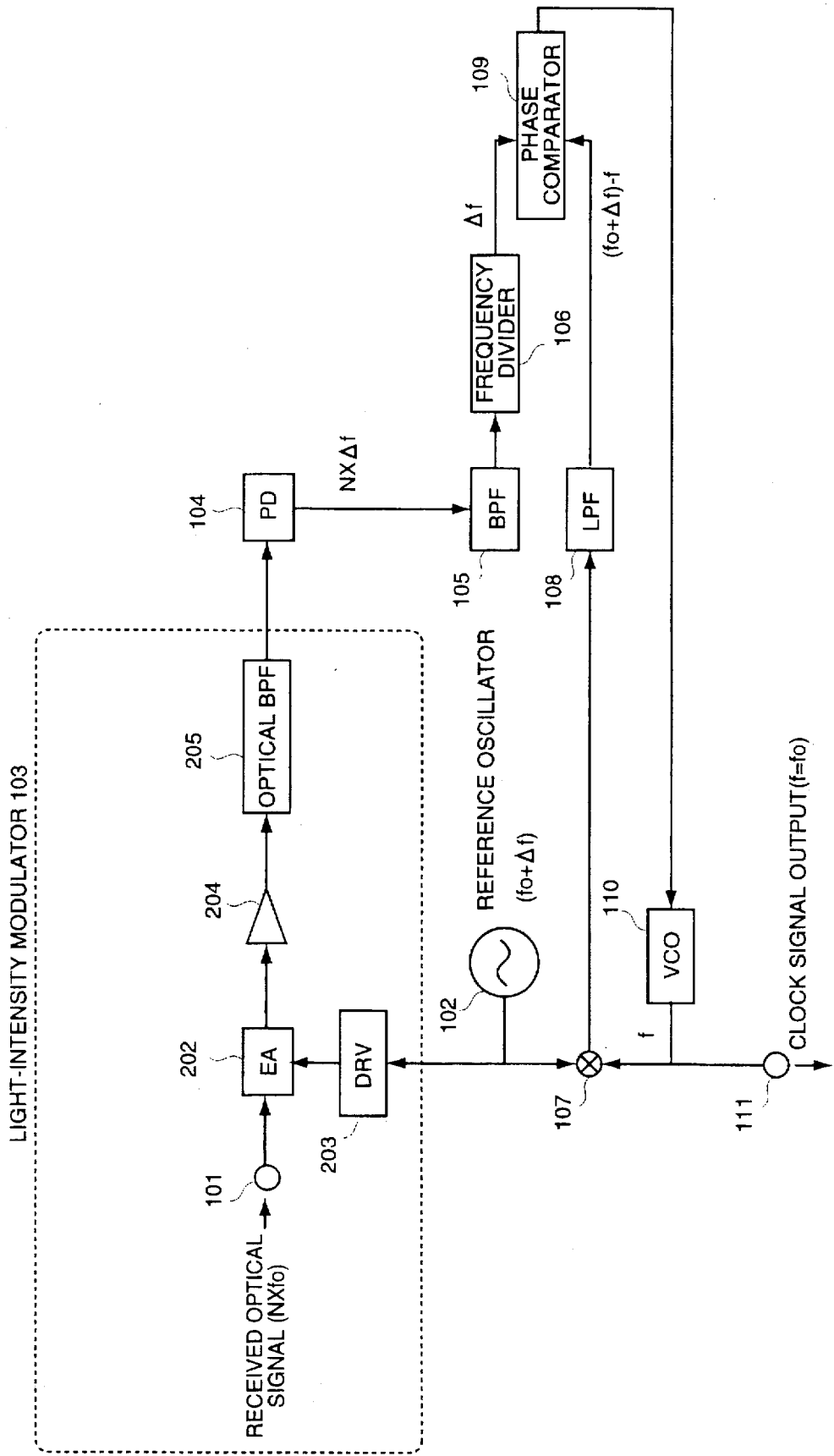
FIG. 5 is a block diagram showing an optical PLL circuit according to the second embodiment of the present invention.

FIG. 5 is a block diagram illustrating an optical PLL circuit according to the second embodiment of the present invention.

The light-intensity modulator 103 includes an AND processing circuit using the EA modulator. The light-intensity modulator 103 comprises an EA modulator 202 for intensity modulating a received optical signal, a high-rate driver 203 for driving the EA modulator at a repetitive frequency (f0+Δf), an optical amplifier 204, and an optical band pass filter 205.

The EA modulator 202 implements an AND operation by directly receiving a received optical signal, thus providing intensity-modulated light. The optical amplifier 204 amplifies the output light. The optical band pass filter 205 extracts the low frequency component from the amplified output light. The light receiving element 104 converts the low frequency component into an electric signal of the low frequency component (N×Δf). The optical PLL circuit can be realized by constructing the remaining portion according to the first embodiment.

Figure 6:
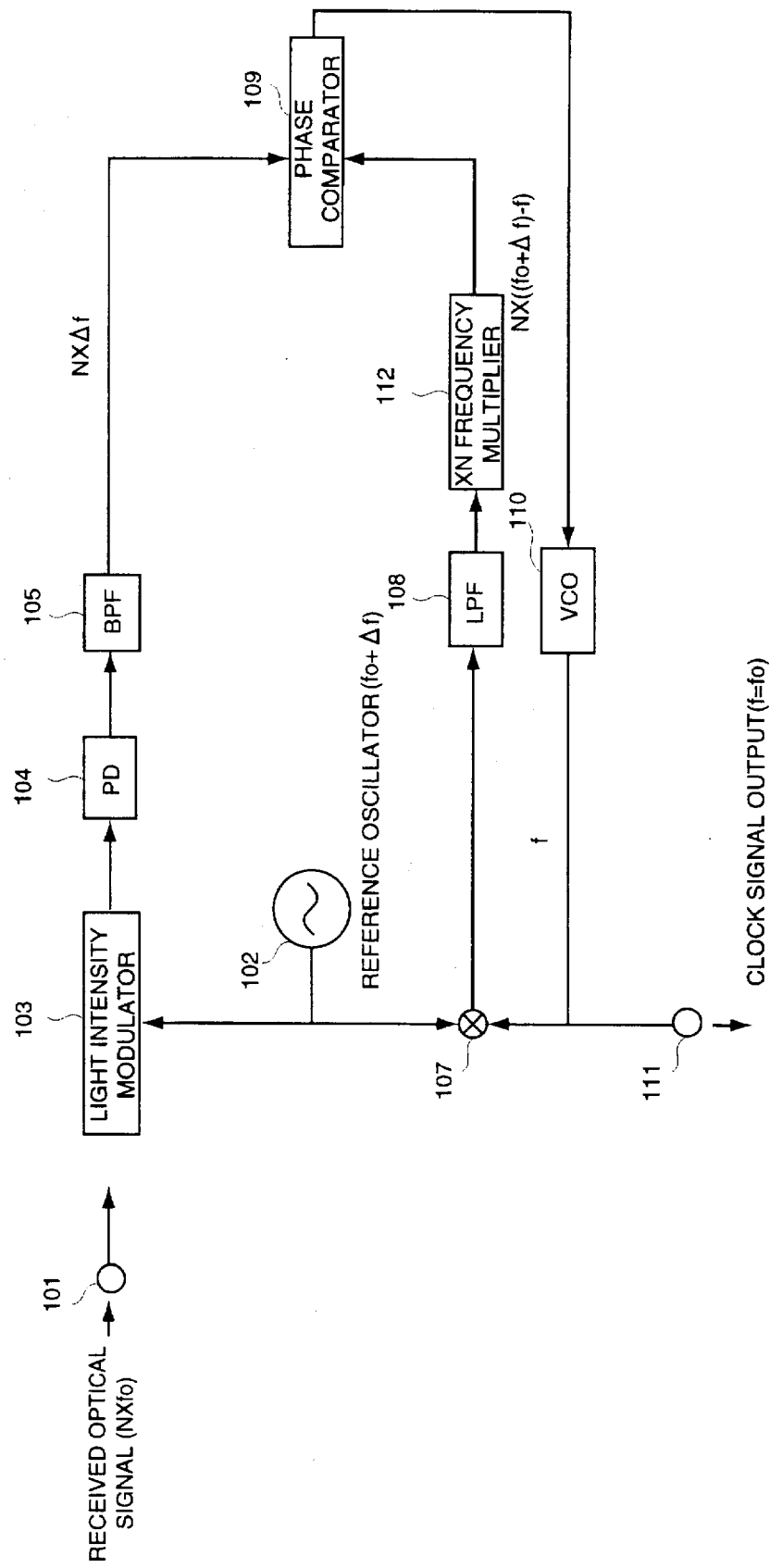
FIG. 6 is a block diagram showing an optical PLL circuit according to the third embodiment of the present invention.

FIG. 6 is a block diagram illustrating the optical circuit according to the third embodiment of the present invention. The corresponding configuration of the first or third embodiment may selectively adopted as the optical intensity modulator 103. In this embodiment, the light receiving element (PD) 104 converts an optical signal from the optical intensity modulator 103 into an electric signal. The band pass filter (BPF) 105 extracts only the low frequency component (N×Δf) from the electric signal and then inputs it to the phase comparator 109 without any change. In response to the output signal from the voltage-controlled oscillator 110 and the output signal from the reference oscillator 102, the multiplier 107 creates a signal of a frequency ((f0+Δf)−f), or the frequency difference component between the two signals. The low pass filter 108 extracts only the low frequency component ((f0+Δ)−f) from the multiplier 107. The frequency multiplier 112 multiplies the extracted component by N. The frequency multiplier 112 inputs its output (N×(((f0+Δf)−f)) to the phase comparator 109.

The optical PLL circuit can be realized by constructing the remaining portion according to the first embodiment.

Figure 7:
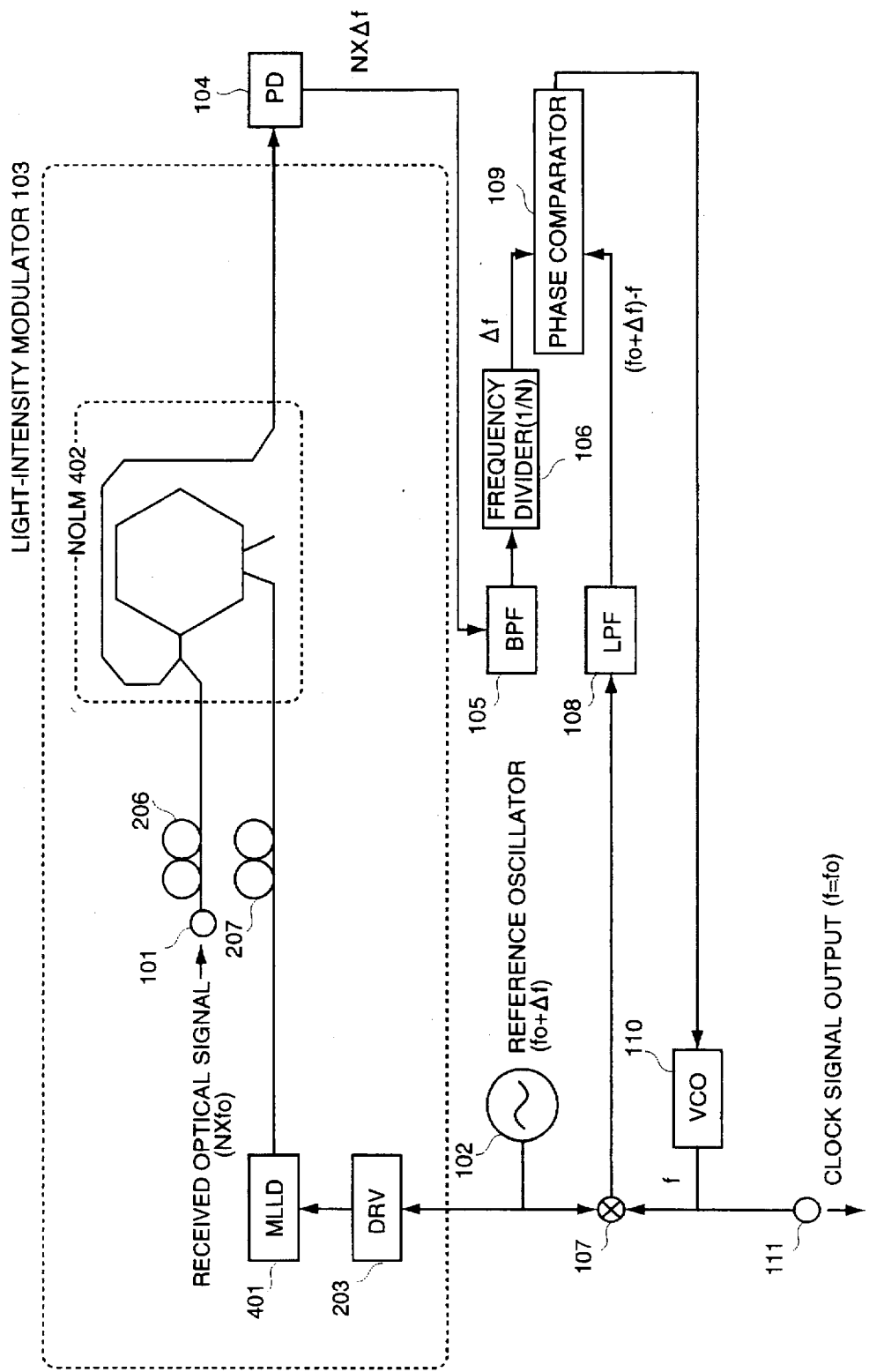
FIG. 7 is a block diagram showing an optical PLL circuit according to the fourth embodiment of the present invention.
Figure 8:
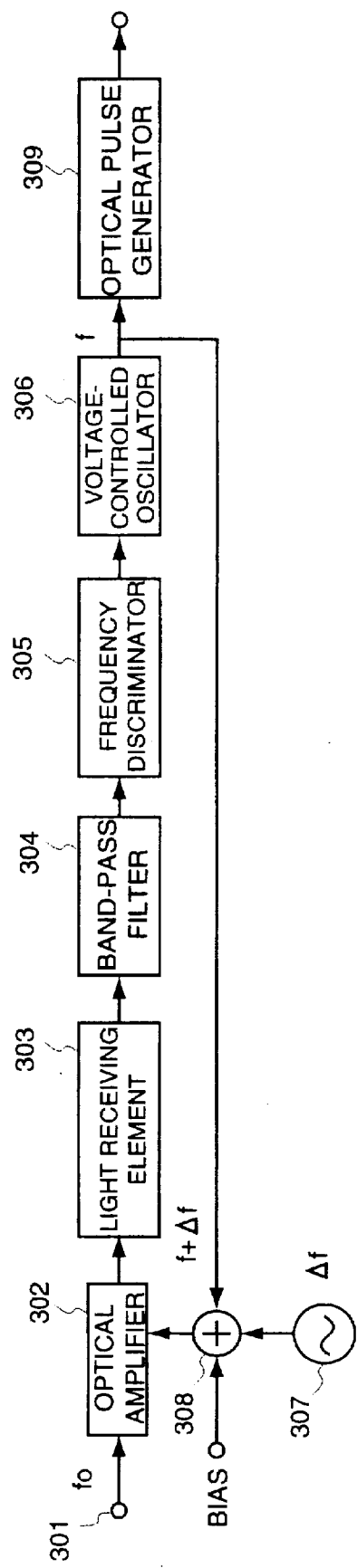
FIG. 8 is a block diagram showing the basic configuration of a conventional optical PLL circuit.

FIG. 7 is a block diagram illustrating the optical PLL circuit according to the fourth embodiment of the present invention. In this embodiment, a mode synchronous semiconductor laser (MLLD) 401 is used as the light signal source of a wavelength (λ0+Δλ) used in the first embodiment (reference literature: T. Ono et. al. OFC'95 Technical Digest, Th14, pp 288–289). The non-linear loop mirror (NOLM) circuit is used as the optical AND process (reference literature: Y. Yano et. al, OFC'95 Technical Digest, WH4, pp 127–129).

The mode synchronous semiconductor laser 401 receives the output signal of a frequency (f0+Δf) from the reference oscillator 102 via the high-rate driver 203 and then outputs a reference optical signal of a repetitive frequency (f0+Δf). The polarized wave controller 207 adjusts the polarized wave of the reference optical signal output from the mode synchronous semiconductor laser 401 and then inputs the resultant to the NOLM circuit 402. The polarized wave controller 206 adjusts the polarized wave of the received optical signal. The NOLM circuit 402 implements an AND operation of the two resultant polarized waves and then outputs the signal light containing the difference frequency information (N×Δf). The optical PLL circuit can be realized by constructing the remaining portion according to the first embodiment.

In the first embodiment, a semiconductor laser amplifier is used as an optical system configuration and generates a four wave mixed (FWM) light to implement an AND operation. However, the ordinary optical system configuration that propagates an optical light combined with a reference light signal differently emitted in, for example, a continuous optical fiber can implement an AND operation. Thus, the optical PLL circuit according to the present invention can be configured without no semiconductor laser amplifier. Furthermore, in the configuration in the above-mentioned embodiments, the FWM light is separated to extract the difference frequency component between the received optical signal and the reference signal as an electric signal. However, because there is a sufficient frequency difference between the repetitive frequency and other received optical signal, the optical PLL circuit can be configured such that an electric circuit system filters and extracts the difference frequency information from the signal obtained by light-to-electric signal conversion after the AND operation. In the above-mentioned preferable embodiments, two signals each with the same frequency are compared in phase. However, two signals each with a difference frequency may be compared in phase.

According to the present invention, the PLL circuit receives signal optical pulses of a repetitive frequency N times the clock frequency f0 and produces a chain of clock pulses which has the same frequency as the clock frequency f0 based on the signal optical pulses and which is in synchronism with the phase thereof. The reference oscillator in the optical PLL circuit can directly produce a signal of a frequency (f0+Δf). Hence, the mixer that creates the sum frequency (f+Δf) of the frequency f and the low frequency Δf, which is difficult to be realized, is not needed. This allows the high precision optical PLL circuit to be realized in a simplified configuration.

The entire disclosure of Japanese Patent Application No. 8-337726 filed on Dec. 4, 1996 including specification, claims, drawing and summary are incorporated herein by reference in its entirety.

What is claimed is:

1. An optical PLL (Phase-Locked Loop) circuit that receives an optical signal of a repetitive frequency N times (N is an arbitrary natural number) of a clock frequency f0 and then produces a clock signal in synchronism with said received optical signal, comprising:

reference oscillator for generating a reference signal (f0+Δf) which is shifted from said clock frequency f0 by a frequency Δf;

a voltage-controlled oscillator for generating a clock signal;

optical system means for creating a difference frequency component by implementing an AND operation of said received optical signal and said reference signal;

optical signal detecting means for extracting said difference frequency component as an electric signal;

a multiplier for creating a difference frequency component between an output signal from said reference oscillator and an output signal from said voltage-controlled oscillator;

phase difference comparison means for comparing the phase of an output signal from said optical signal detecting means with the phase of an output signal from said multiplier; and means for controlling said voltage-controlled oscillator with an output signal from said phase difference comparison means.

2. The optical PLL circuit of claim 1, wherein said optical system means implements an AND operation by combining said received optical signal with a reference optical signal, said reference optical signal being produced by intensity modulating output light from a light source with said reference signal.

3. The optical PLL circuit of claim 1, wherein said optical system means implements an AND operation by combining said received optical signal with a reference optical signal, said reference optical signal being produced by intensity modulating output light from a light source with said reference signal, and then amplifying the combined signal by means of a semiconductor laser amplifier.

4. The optical PLL circuit of claim 1, wherein said optical system means implements an AND operation by intensity-modulating said received optical signal with a reference optical signal.

5. The optical PLL circuit of claim 1, wherein said optical system means implements an AND operation by inputting said received optical signal and a reference optical signal to a non-linear loop mirror circuit, said reference optical signal being produced by intensity modulating a mode synchronous semiconductor laser with said reference signal.

6. An optical PLL (Phase-Locked Loop) circuit that receives an optical signal of a repetitive frequency N times (N is an arbitrary natural number) of a clock frequency f0 and then produces a clock signal in synchronism with said received optical signal from said received optical signal, comprising:

a reference oscillator for generating a reference signal (f0+Δf) which is shifted from a clock frequency f0 by a frequency Δf;

a light intensity modulator for implementing an AND operation of said received optical signal and an output signal from said reference oscillator;

a light receiving element for converting an output signal from said light intensity modulator into an electric signal;

a narrow band pass filter for extracting a low frequency component (N×Δf) of an electric signal output from said light receiving element;

a frequency divider for dividing the frequency of said low frequency component output from said narrow band pass filter by N;

a voltage-controlled oscillator for generating a clock signal;

a multiplier for creating the frequency reference component ((f0+Δf)−f) between an output signal from said reference oscillator and an output signal from said voltage-controlled oscillator;

a low pass filter for extracting a low frequency component output from said multiplier; and a phase comparator for detecting the phase difference between the low frequency component output from said frequency divider and the low frequency component from said low pass filter and then controlling said voltage-controlled oscillator so as to achieve agreement in phase between said low frequency components.

7. An optical PLL (Phase-Locked Loop) circuit that receives an optical signal of a repetitive frequency N times (N is an arbitrary natural number) of a clock frequency f0 and then produces a clock signal in synchronism with said received optical signal from said received optical signal, comprising:

a reference oscillator for generating a reference signal (f0+Δf) which is shifted from a clock frequency f0 by a frequency Δf;

a light intensity modulator for implementing an AND operation of said received optical signal and an output signal from said reference oscillator;

a light receiving element for converting an output signal from said light intensity modulation circuit into an electric signal;

a narrow band pass filter for extracting a low frequency component (N×Δf) of an electric signal output from said light receiving element;

a voltage-controlled oscillator for generating a clock signal;

a multiplier for creating the difference frequency component ((f0+Δf)−f) between an output signal from said reference oscillator and an output from said voltage-controlled oscillator;

a low pass filter for extracting a low frequency component output from said multiplier;

a frequency multiplier for multiplying the low frequency component output from said low pass filter by N; and a phase comparator for detecting the phase difference between the low frequency component output from said narrow band filter and the low frequency component from said multiplying circuit and then controlling said voltage-controlled oscillator so as to achieve agreement in phase said low frequency components.

8. A method of controlling an optical PLL circuit including a reference oscillator and a voltage-controlled oscillator, comprising the steps of:

implementing an AND operation of a received optical signal of a repetitive frequency (N×f0) (where f0 is a clock signal) and an oscillation signal of an oscillation frequency (f0+Δf) from said reference oscillator to produce an optical signal containing a low frequency component (N×Δf), converting said optical signal into an electric signal, extracting only said low frequency component (N×Δf) from said electric signal, multiplying an oscillation signal of a frequency f by said oscillation signal of the oscillation frequency (f0+Δf) to create a signal of a difference frequency component ((f0+Δf)−f), comparing in phase said low frequency (N+Δf) with said difference frequency component ((f0+Δf)−f), and controlling a control voltage to said voltage-controlled oscillator so as to agree the phase of said low frequency with the phase of said difference frequency component, wherein the frequency f of the oscillation signal from said voltage-controlled oscillator is equalized to said clock frequency f0.

* * * * *

UNITED STATES PATENT AND TRADEMARK OFFICE
CERTIFICATE OF CORRECTION

PATENT NO.    : 5,894,247
DATED         : April 13, 1999
INVENTOR(S)   : Masanori YOSHIDA, Kenichi YONEYAMA and Tobru TAURA It is certified that error(s) appears in the above-identified patent and that said Letters Patent is hereby corrected as shown below:

Column 1, line 9, delete "pluses" and insert --pulses--;

Column 2, line 5, delete "is" and insert --it--;

Column 3, line 28, delete "pluses" and insert --pulses--;

Column 6, line 67, delete "Δ" and insert --Δf--;

Column 7, line 8, delete "Δ" and insert --Δf--;

Column 7, line 51, delete "Δ" and insert --Δf--;

Column 8, line 46, delete "f" before "and", and insert --f0--.

Signed and Sealed this

Fourth Day of April, 2000

Attest:

Attesting Officer

Q. TODD DICKINSON

Director of Patents and Trademarks

UNITED STATES PATENT AND TRADEMARK OFFICE
CERTIFICATE OF CORRECTION

PATENT NO. : 5,894,247
DATED : April 13, 1999
INVENTOR(S) : Masanori YOSHIDA, Kenichi YONEYAMA and Tobru TAURA It is certified that error appears in the above-identified patent and that said Letters Patent is hereby corrected as shown below:

Column 8, line 45, delete first occurrence of "f" and insert --f0--.

Signed and Sealed this

Twenty-fifth Day of July, 2000

Attest:

Q. TODD DICKINSON

*Attesting Officer*  *Director of Patents and Trademarks*